No. 788,268. PATENTED APR. 25, 1905.
G. KRUEGER.
DISINFECTING DEVICE.
APPLICATION FILED JULY 13, 1904.

2 SHEETS—SHEET 1.

WITNESSES:
John J. Tuttle
S. H. Cobb.

INVENTOR
George Krueger
BY
[signature]
ATTORNEYS

No. 788,268. PATENTED APR. 25, 1905.
G. KRUEGER.
DISINFECTING DEVICE.
APPLICATION FILED JULY 13, 1904.
2 SHEETS—SHEET 2.
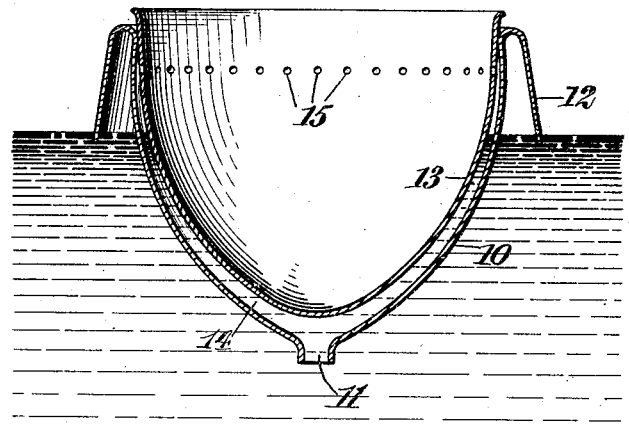
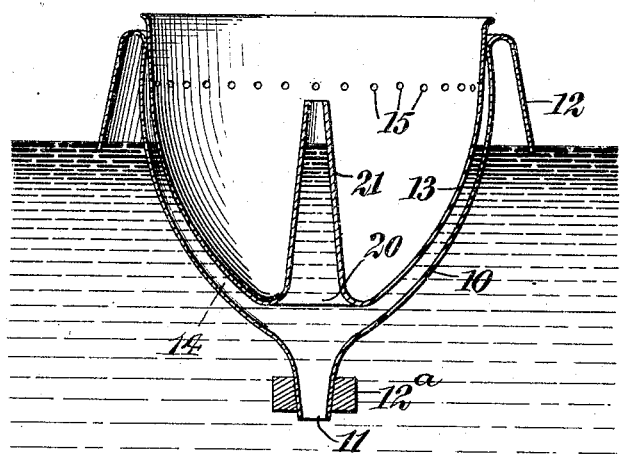
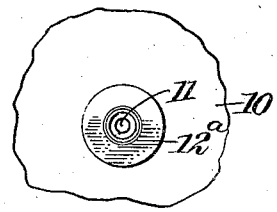
WITNESSES:
John J. Kittle
S. H. Cobb
INVENTOR
George Krueger
BY
Munn
ATTORNEYS No. 788,268. Patented April 25, 1905.

UNITED STATES PATENT OFFICE.

GEORGE KRUEGER, OF JOHNSTOWN, PENNSYLVANIA.

DISINFECTING DEVICE.

SPECIFICATION forming part of Letters Patent No. 788,268, dated April 25, 1905.

Application filed July 13, 1904. Serial No. 216,423.

*To all whom it may concern:*

Be it known that I, GEORGE KRUEGER, a citizen of the United States, and a resident of Johnstown, in the county of Cambria and State of Pennsylvania, have invented a new and Improved Disinfecting Device, of which the following is a full, clear, and exact description.

My invention relates to devices for the burning of disinfectants, it being particularly useful in connection with the combustion of sulfur to produce sulfurous-acid vapor. Its principal objects are to provide a convenient and effective device for this purpose; and it consists in the various features hereinafter described and claimed.

Reference is to be had to the accompanying drawings, forming a part of this specification, in which similar characters of reference indicate corresponding parts in all the figures.

Figure 1:
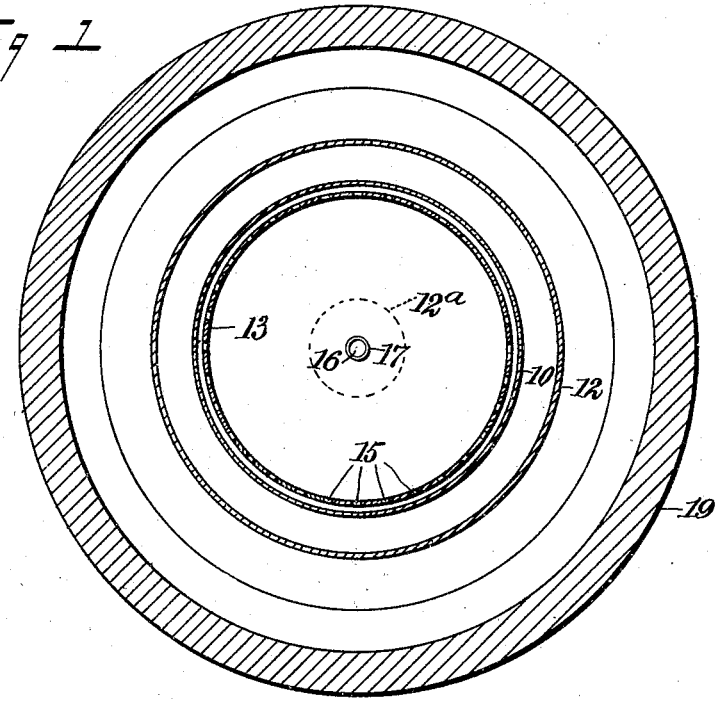
Figure 2:
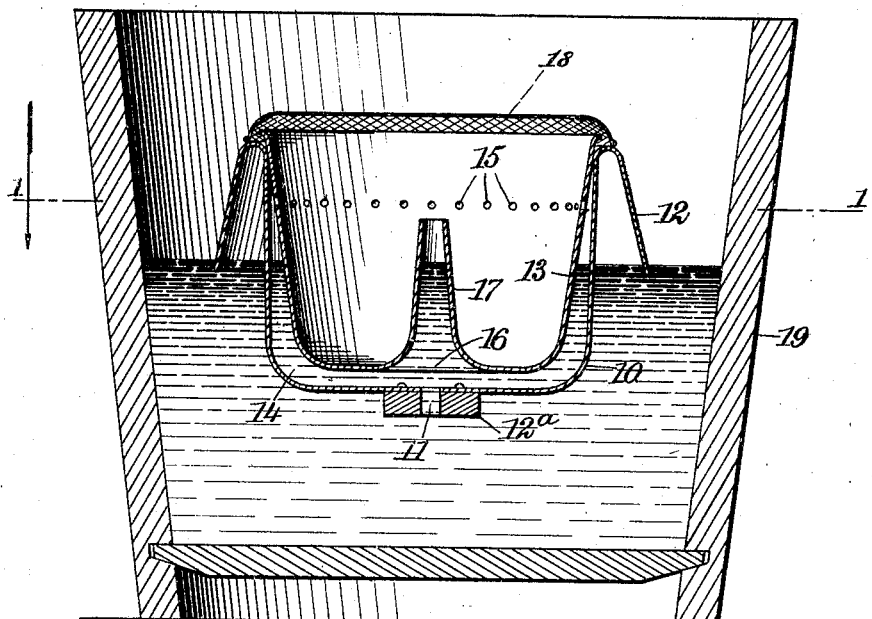

Figure 1 is a horizontal section through one embodiment of my invention, it being taken on the line 1 1 of Fig. 2. Fig. 2 is a central vertical section through the device. Fig. 3 is a similar view of another embodiment of my invention, the containing vessel being omitted. Fig. 4 shows still another form, and Fig. 5 is a detail in bottom plan view of the opening and surrounding weight of the fluid-receptacle.

10 designates a vessel, shown as having substantially straight sides and a flat bottom, which serves as a fluid-receptacle and has a main or upper opening and at least one other opening, 11, preferably at the bottom of the vessel, through which fluid may be introduced. At the upper portion this vessel carries a float, which, as illustrated, consists of a depending skirt or flange 12, beneath which a body of air will be retained when the vessel is floated in a body of liquid. Secured to the bottom of the vessel, preferably surrounding the opening 11, is a weight $12^a$, which lowers the center of gravity, so as to insure stable equilibrium while floating.

Extending into the main opening of the vessel 10 is a second vessel 13, in which the combustion of the material is carried on. The two vessels may be of any desired shape, nesting together at their upper edges and preferably fitting closely at the line of contact, thus moving together in use; but they are so formed that between them is left an intermediate space or fluid-chamber 14. This fluid-receptacle communicates with the material-receptacle by means of what is here shown as a circular series of small openings 15, situated near the upper edge of the inner vessel. If desired, additional communication may be had through an opening 16 in the bottom of the vessel 13, about which is an upward extension 17, rising above the level of the fluid.

A covering is preferably provided for the receptacle 13, which may be of inverted-dish shape resting upon the edge of the receiver 10 and being of meshed or perforated material 18. It is readily removed to provide for the substitution of other covers having different-sized openings.

In using the device the receiver 10 is placed upon a body of preferably hot water contained in some such receptacle as is indicated at 19 in Figs. 1 and 2 of the drawings. The receptacle 13 is then provided with the disinfecting combustible—as, for example, sulfur—and when this has been done the buoyancy of the air beneath the receiver-flange will cause the two vessels to float at such a height that the water entering through the opening 11 will not rise above the openings 15. The weight $12^a$ causes the vessels to occupy an upright position. The sulfur is now ignited and burns, producing sulfurous oxid, and in doing so heats the walls of the receptacle and the water contacting with it and generates steam. This rises into the upper portion of the intermediate chamber and passing through the openings 15 enters into chemical combination with the sulfurous oxid, producing sulfurous acid in the form of a vapor. Steam also rises through the extension 17 and joins in the combination. This escapes through the opening in the top of the receptacle. If the evolution of the disinfecting-vapor is not sufficiently great, a cover having the proper aggregate area of perforations may be placed over the vessels, thus diminishing the supply of air and causing the sulfur to burn more slowly. This prolongs the time of burning and since it retards the escape of heat increases the evaporation of the water, thereby producing a stronger vapor.

In Fig. 3 of the drawings is shown a form of my improved device having a less capacity than that previously described, the bottoms of the vessels being of inclined or ovoid form rather than flat, thus diminishing the heating-surface, and there being no central opening connecting the outer and inner vessels.

The form illustrated in Figs. 4 and 5 is in a general way similar to that of Fig. 3; but here a central opening 20, with an upward extension 21, is provided, the capacity of the device being between the two above described.

It should be noted that any one of these devices used with a cover having a particular area of combined openings will yield a substantially definite quantity and quality of sulfurous-acid vapor, which will adapt it for the disinfecting of a certain amount of room-space. Therefore in operating in a larger space it is only necessary to use an additional number of units to effect the desired result. As the vessel for the combustible is supported with a body of water, the danger of fire or damage to surrounding objects is obviated. Since the water entering the chamber 14 maintains itself at the level of the receptacle 19, a uniform supply to the device is automatically secured.

Having thus described my invention, I claim as new and desire to secure by Letters Patent—

1. A disinfecting device comprising a fluid-receiver provided with a main opening and a second opening for the introduction of the fluid, and a receptacle for a combustible extending into the fluid-receiver through the main opening and having an opening communicating with the fluid-receiver above the fluid-level, said fluid-receiver and combustible-receptacle being connected to move together in use.

2. A disinfecting device comprising a fluid-receiver provided with a main opening and a second opening for the introduction of the fluid, and a receptacle for a combustible extending into the fluid-receiver through the main opening and tightly fitting the same, but leaving below an intermediate space, said combustible-receptacle having an opening connected with the upper portion of this space.

3. A disinfecting device comprising a fluid-receiver provided with a main opening and a second opening for the introduction of the fluid, and a receptacle for a combustible extending into the fluid-receiver through the main opening, but leaving below an intermediate space, said combustible-receptacle having a series of openings connected with the upper portion of this space.

4. A disinfecting device comprising a fluid-receiver provided with a main opening and a second opening for the introduction of the fluid, a receptacle for a combustible extending into the fluid-receiver through the main opening and having an opening communicating with said fluid-receiver, and a float carried by the upper portion of the fluid-receiver.

5. A disinfecting device comprising a fluid-receiver provided with a main opening and a second opening for the introduction of the fluid, a receptacle for a combustible extending into the fluid-receiver through the main opening and having an opening communicating with the fluid-receiver, and an imperforate flange depending from the upper portion of the fluid-receiver.

6. A disinfecting device comprising a buoyant fluid-receiver provided with a main opening and a second opening for the introduction of the fluid, a receptacle for a combustible extending into the fluid-receiver through the main opening and having an opening communicating with the fluid-receiver, and a weight secured at the bottom of the fluid-receiver.

7. A disinfecting device comprising a buoyant fluid-receiver provided with a main opening and a second opening for the introduction of the fluid, a receptacle for a combustible extending into the fluid-receiver through the main opening and having a bottom opening, and a tubular extension surrounding said opening.

8. A disinfecting device comprising a buoyant fluid-receiver provided with a main opening and a second opening for the introduction of the fluid, a receptacle for a combustible extending into the fluid-receiver through the main opening and having an opening communicating with the fluid-receiver, and a removable perforate cover for the combustible-receptable.

9. A disinfecting device comprising a fluid-receiver, a receptacle for a combustible carried by and communicating with the fluid-receiver, and a flange depending from the upper portion of the fluid-receiver and serving as a float.

10. A disinfecting device comprising a buoyant fluid-receiver, and a receptacle for a combustible extending into the receiver below the fluid-level and having an opening establishing communication with the receiver above the fluid-level.

In testimony whereof I have signed my name to this specification in presence of two subscribing witnesses.

GEORGE KRUEGER.

Witnesses:
ANTHONY W. KRUEGER,
CLARKE P. COLLINS.